United States Patent
Shirakawa et al.

(10) Patent No.: US 9,114,384 B2
(45) Date of Patent: Aug. 25, 2015

(54) EXHAUST GAS PURIFICATION CATALYST AND METHOD FOR PRODUCING IT

(75) Inventors: Shogo Shirakawa, Gotenba (JP); Naoto Nagata, Susono (JP); Kimiyasu Ono, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/239,827

(22) PCT Filed: Aug. 17, 2012

(86) PCT No.: PCT/JP2012/070926
§ 371 (c)(1),
(2), (4) Date: Feb. 20, 2014

(87) PCT Pub. No.: WO2013/027677
PCT Pub. Date: Feb. 28, 2013

(65) Prior Publication Data
US 2014/0206530 A1   Jul. 24, 2014

(30) Foreign Application Priority Data
Aug. 23, 2011   (JP) .................... 2011-181791

(51) Int. Cl.
*B01J 23/58*   (2006.01)
*B01J 23/52*   (2006.01)
(Continued)

(52) U.S. Cl.
CPC ............ *B01J 23/52* (2013.01); *B01D 53/9413* (2013.01); *B01J 23/464* (2013.01); *B01J 23/66* (2013.01); *B01J 35/002* (2013.01); *B01J 35/006* (2013.01); *B01J 35/0006* (2013.01); *B01J 37/16* (2013.01); *B01D 2255/106* (2013.01); *B01D 2255/1025* (2013.01); *B01D 2255/9202* (2013.01); *B01D 2258/012* (2013.01); *B01J 35/008* (2013.01); *F01N 3/10* (2013.01)

(58) Field of Classification Search
USPC ........................................ 502/330
See application file for complete search history.

(56) References Cited

U.S. PATENT DOCUMENTS 3,840,471 A     10/1974  Acres
5,208,203 A  *   5/1993  Horiuchi et al. .............. 502/302
(Continued)

FOREIGN PATENT DOCUMENTS

CN         101161342        4/2008
EP         2 682 206 A1     1/2014
(Continued)

OTHER PUBLICATIONS

International Search Report Issued Nov. 6, 2012 in PCT/JP12/070926 Filed Aug. 17, 2012.
(Continued)

*Primary Examiner* — Cam N. Nguyen
(74) *Attorney, Agent, or Firm* — Oblon, McClelland, Maier & Neustadt, L.L.P.

(57) ABSTRACT

The purpose of the present invention is to provide an exhaust gas purification catalyst which can decrease a NOx reduction temperature and comprises rhodium and gold. An exhaust gas purification catalyst which carries two-element microparticles each comprising rhodium and gold, said catalyst being characterized in that the rhodium and the gold are phase-separated from each other and the content ratio of the rhodium to the gold (i.e., rhodium:gold) is (30-99.9 at. %):(70-0.1 at. %) in the two-element microparticles.

8 Claims, 5 Drawing Sheets

(51) Int. Cl.
  *B01D 53/94* (2006.01)
  *B01J 35/00* (2006.01)
  *B01J 23/46* (2006.01)
  *B01J 37/16* (2006.01)
  *B01J 23/66* (2006.01)
  *F01N 3/10* (2006.01)

(56) References Cited

U.S. PATENT DOCUMENTS

| | | | | |
|---|---|---|---|---|
| 6,121,191 | A * | 9/2000 | Komatsu et al. | 502/330 |
| 6,147,027 | A * | 11/2000 | Miyake et al. | 502/325 |
| 6,194,338 | B1 | 2/2001 | Andolfatto et al. | |
| 6,365,545 | B1 * | 4/2002 | Komatsu et al. | 502/326 |
| 6,806,224 | B2 * | 10/2004 | Yoshihara et al. | 502/185 |
| 6,861,387 | B2 | 3/2005 | Ruth et al. | |
| 7,109,145 | B2 | 9/2006 | Ruth et al. | |
| 7,138,353 | B2 * | 11/2006 | Takeshima et al. | 502/64 |
| 7,601,670 | B2 | 10/2009 | Yasuda et al. | |
| 7,700,521 | B2 | 4/2010 | Giaquinta et al. | |
| 7,713,911 | B2 | 5/2010 | Wakamatsu et al. | |
| 7,727,931 | B2 * | 6/2010 | Brey et al. | 502/344 |
| 7,955,570 | B2 * | 6/2011 | Insley et al. | 422/222 |
| 8,105,561 | B2 * | 1/2012 | Hatanaka et al. | 423/213.5 |
| 8,273,504 | B2 | 9/2012 | Goia et al. | |
| 8,304,030 | B2 * | 11/2012 | He et al. | 427/450 |
| 8,314,048 | B2 * | 11/2012 | Brey et al. | 502/344 |
| 8,361,924 | B2 * | 1/2013 | Tanaka et al. | 502/313 |
| 8,664,149 | B2 | 3/2014 | Brady et al. | |
| 2003/0017943 | A1 | 1/2003 | Shan et al. | |
| 2008/0241642 | A1 | 10/2008 | Lordache et al. | |
| 2009/0291352 | A1 | 11/2009 | Oshihara et al. | |
| 2010/0076208 | A1 | 3/2010 | Dhingra et al. | |
| 2010/0190641 | A1 | 7/2010 | Goia et al. | |
| 2011/0065025 | A1 | 3/2011 | Yu | |
| 2011/0245068 | A1 | 10/2011 | Stamendovic et al. | |
| 2011/0274989 | A1 | 11/2011 | Lu et al. | |
| 2012/0094140 | A1 | 4/2012 | Kitagawa et al. | |
| 2012/0208696 | A1 | 8/2012 | Stamenkovic et al. | |

FOREIGN PATENT DOCUMENTS

| | | |
|---|---|---|
| JP | 2002-102679 | 4/2002 |
| JP | 2003-88757 A | 3/2003 |
| JP | A-2005-313012 | 11/2005 |
| JP | A-2006-198490 | 8/2006 |
| JP | A-2010-100899 | 6/2010 |
| JP | 2010 194384 | 9/2010 |
| JP | 2012 179573 | 9/2012 |
| WO | WO2010/095761 | 8/2010 |
| WO | WO2010/122811 | 10/2010 |

OTHER PUBLICATIONS

Laszlo Ovari, et al., "Surface Structure and Composition of Au—Rh Bimetallic Nanoclusters on $TiO_2$ (110): A LEIS and STM Study", *J. Phys. Chem. C.*, vol. 112, No. 46, Oct. 23, 2008, pp. 18011-18016.

Janos Kiss, et al., "Characterization of Au—Rh and Au—Mo Bimetallic Nanoclusters on $TiO_2$(110): A Comparative Study", React. Kinet. Catal. Lett. vol. 96, No. 2, 2009, pp. 391-396.

J. Kiss, et al., "Role of the nature of support on the structure of Au—Rh bimetallic nanoparticles", Vacuum, vol. 86, No. 6, 2012, pp. 594-598.

Licheng Liu, et al., "Supported bimetallic AuRh/γ-$Al_2O_3$ nanocatalyst for the selective catalytic reduction of NO by propylene", Applied Catalysis B: Environmental, vol. 90, No. 1-2, 2009, pp. 1-9.

Elizabeth R. Essinger-Hileman, et al., "Aqueous room-temperature synthesis of Au—Rh, Au—Pt, Pt—Rh, and Pd—Rh alloy nanoparticles: fully tunable compositions within the miscibility gaps", Journal of Materials Chemistry, vol. 21, No. 31, 2011, pp. 11599-11604.

Naoki Toshima, et al., "Catalytic Activity and Structural Analysis of Polymer-Protected Au—Pd Bimetallic Clusters Prepared by the Simultaneous Reduction of $HAuCl_4$ and $PdCl_2$ ", *J. Phys. Chem.*, vol. 96, XP-002438113,1992, pp. 9927-9933.

Naoki Toshima, et al., "Polymer-Protected Bimetallic Nanocluster Catalysts Having Core/Shell Structure for Accelerated Electron Transfer in Visible-Light-Induced Hydrogen Generation", Polymer Journal, vol. 31, No 11-2, XP-008135033,1999, pp. 1127-1132.

Office Action issued Aug. 22, 2014, in U.S. Appl. No. 14/002,793, filed Dec. 13, 2013.

Office Action issued Nov. 5, 2014, U.S. Appl. No. 14/002,793, filed Dec. 13, 2013.

Notice of Allowance issued Jan. 26, 2015, in U.S. Appl. No. 14/002,793, filed Dec. 13, 2013.

Notice of Allowance issued Apr. 20, 2015, in co-pending U.S. Appl. No. 14/002,793, filed Dec. 13, 2013.

Notice of Reasons for Rejection mailed Jun. 2, 2015, in Japanese Application No. 2013-530002, with English Translation.

* cited by examiner

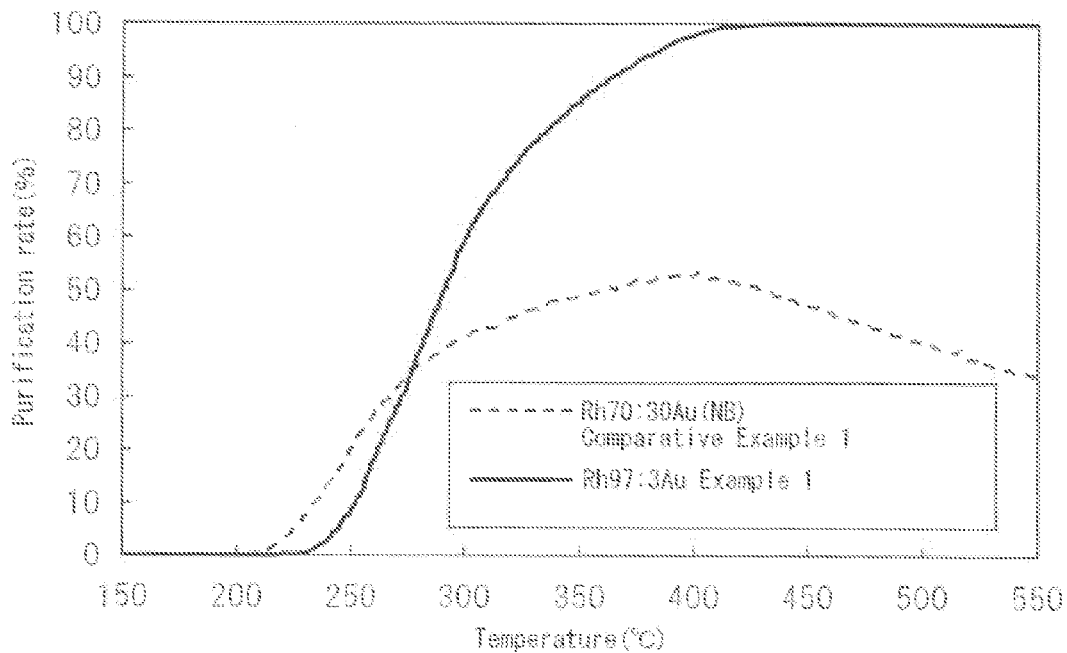
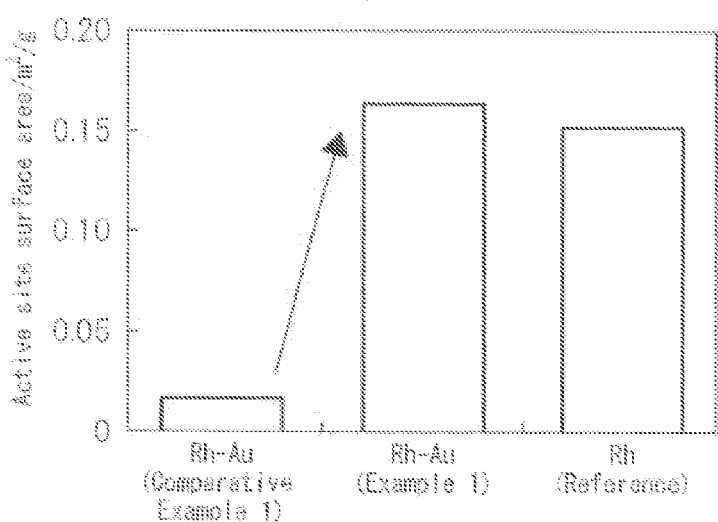

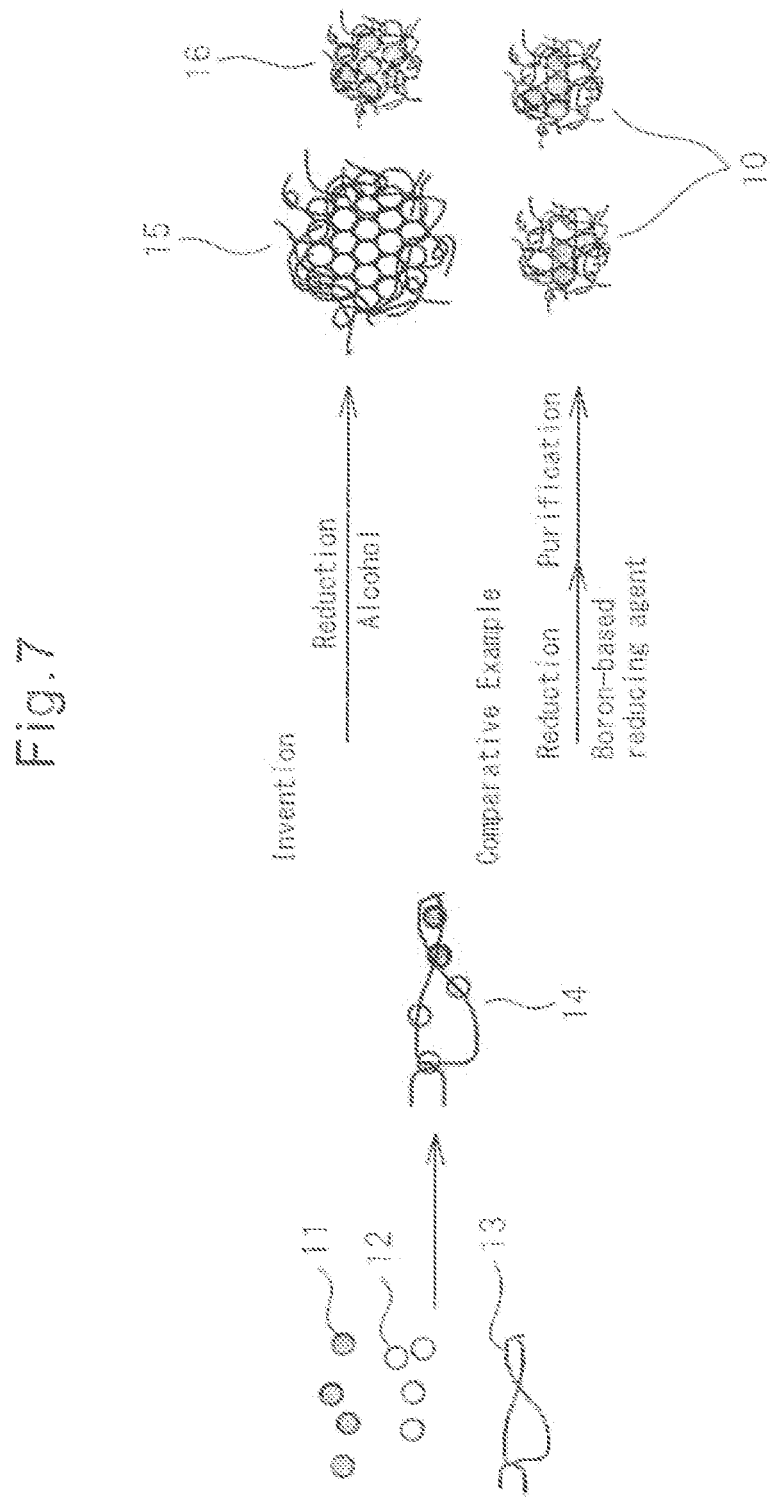

EXHAUST GAS PURIFICATION CATALYST AND METHOD FOR PRODUCING IT

TECHNICAL FIELD

The present invention relates to an exhaust gas purification catalyst, and particularly to a catalyst supporting fine particles composed of rhodium and gold, and to a method for producing it.

BACKGROUND ART

In recent years, worldwide restrictions on exhaust gas are becoming tighter from the viewpoint of environmental protection. Exhaust gas purification catalysts are being employed in internal combustion engines as one measure. In order to efficiently remove the hydrocarbons (hereunder abbreviated as "HC"), CO and nitrogen oxides (hereunder abbreviated as "NOx") in exhaust gas, exhaust gas purification catalysts employ precious metals such as Pt, Pd and Rh as catalyst components.

Vehicles using such exhaust gas purification catalysts, such as gasoline engine vehicles and diesel engine vehicles, employ various types of systems designed to increase both catalytic activity and fuel efficiency. For example, in order to increase fuel efficiency, combustion is conducted under lean air/fuel ratio (A/F) conditions (oxygen excess) during steady operation, and in order to increase catalytic activity, combustion is temporarily conducted under stoich (stoichiometric air/fuel ratio, A/F=14.7) to rich (fuel excess) conditions.

This is because conventionally known catalysts including precious metals such as Pt, Pd and Rh have low NOx purification performance under oxidizing conditions, and require a reducing atmosphere by addition of HC or CO to increase purification performance. Because of the effects on catalytic activity it is not possible to increase the air/fuel ratio (A/F) during steady operation, and there has been a limit to increased fuel efficiency with catalysts such as precious metals.

Thus, with conventionally known catalysts such as precious metals, it is necessary to have a fuel that temporarily creates a reducing atmosphere for the purification catalyst, and to lower the air/fuel ratio (A/F) in the engine, and in order to increase the fuel efficiency of internal combustion engines such as vehicle engines, there has been a demand for new purification catalysts that can exhibit NOx purification performance under a stoich atmosphere, for example.

Various modifications have been attempted with the goal of increasing the performance of NOx purification catalysts.

PTL 1 describes an exhaust gas purification catalyst comprising a support made of a metal oxide, and metallic particles supported on the support, wherein the metallic particles are composed of a solid solution of at least one type of first metal selected from the group consisting of Pt, Ag, Mn, Fe and Au, and at least one type of second metal selected from the group consisting of Pd, Rh, Ir and Ru, the mean primary particle size of the metallic particles being 1.5 nm or less, and the standard deviation of the metal compositional ratio for each primary particle of the metallic particles being 10% or less.

However, while PTL 1 mentions Pt and Pd metallic particles as the solid solution, it does not concretely disclose, for example, preventing oxidation of rhodium or lowering the NOx purification temperature.

CITATION LIST

Patent Literature

[PTL 1] Japanese Unexamined Patent Publication No. 2010-194384

DISCLOSURE OF THE INVENTION

Problems to be Solved by the Invention

It is known that, in exhaust gas catalysts for vehicles, rhodium has excellent NOx reducing power in the co-presence of $O_2$, and it is therefore an indispensable element in three-way catalysts for gasoline engines. However, since rhodium is a very costly rare metal and also undergoes drastic fluctuations in price, there is a strong desire for the development of techniques to lower usage of rhodium. In addition, rhodium has reduced activity when oxidized, and therefore it is desirable to prevent oxidation of rhodium. There is also a demand for lower NOx reduction temperatures.

Means for Solving the Problems

The embodiments of the present invention are as follows.

(1) An exhaust gas purification catalyst supporting two-element fine particles composed of rhodium and gold, wherein the rhodium and gold are in separate phases in the two-element fine particles, the rhodium:gold proportion being 30 to 99.9 atomic percent: 70 to 0.1 atomic percent.

(2) An exhaust gas purification catalyst according to (1), wherein the rhodium: gold proportion is 90 to 99 atomic percent: 10 to 1 atomic percent.

(3) An exhaust gas purification catalyst according to claim 1 or 2, wherein the mean primary particle size of the two-element fine particles is 2 nm to 5 nm.

(4) A method for producing an exhaust gas purification catalyst, the method comprising adding an organic compound-based reducing agent to a mixed solution containing a rhodium salt and a gold salt to produce two-element fine particles with the rhodium and gold in separate phases, and then supporting the two-element fine particles on the catalyst, wherein the reducing agent is volatile.

(5) The method for producing an exhaust gas purification catalyst according to (4), which does not include a precipitation procedure using a poor solvent for the two-element fine particles.

Effect of the Invention

According to these embodiments of the invention, it is possible to provide an exhaust gas purification catalyst that prevents oxidation of rhodium and lowers the starting NOx purification temperature, as well as a method for producing it.

BRIEF DESCRIPTION OF THE DRAWINGS

FIG. 5 is a graph showing a plot of NOx purification rate with respect to purification temperature, for a catalyst with a Rh:Au ratio of 97 atomic percent:3 atomic percent according to the invention, and the catalyst of Comparative Example 1.

FIG. 6 is a bar graph showing results of CO pulse measurement for a catalyst of the invention and the catalyst of Comparative Example 1.

FIG. 7 is a diagram schematically showing a production process for two-element fine particles according to the invention.

BEST MODE FOR CARRYING OUT THE INVENTION

Figure 1:
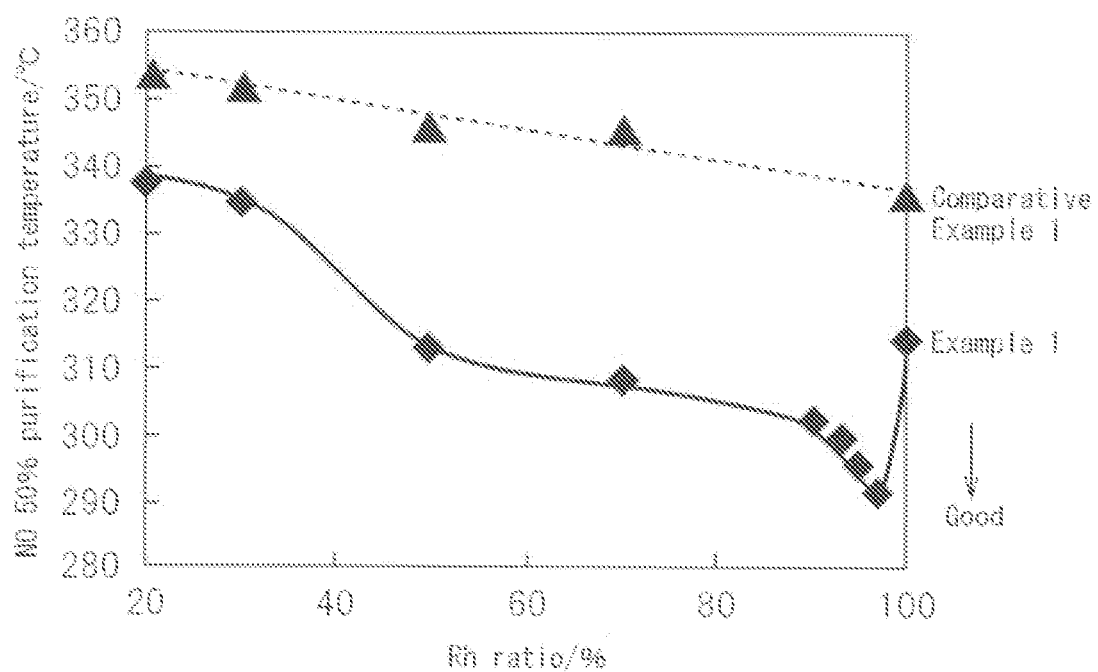
FIG. 1 is a graph showing a plot of NOx 50% purification temperature (° C.) with respect to the ratio of atomic percentage of rhodium to gold, for a catalyst of the invention and the catalyst of Comparative Example 1 (Relationship between Rh proportion and starting NO purification temperature (Rh content=0.1 wt %)).

As a result of diligent effort, the present inventors have completed this invention upon finding that an exhaust gas catalyst supporting two-element fine particles composed of rhodium and gold in separate phases exhibits excellent properties in terms of NOx reducing power.

As used herein, "fine particles" refers to particles having a mean primary particle size on the nanometer level. Fine particles in a split phase refers both to fine particles composed of the different elements in separate phases within the same fine particles, and to fine particles composed of the different elements.

As used herein, "split phase" "separate phases" means that two or more metal elements are mixed but that the metals exist in different phases, and therefore a solid solution, for example, is not included in the concept of "separate phases".

The catalyst of the invention has an atomic percentage ratio of rhodium and gold of 30 to 99.9 atomic percent:70 to 0.1 atomic percent as rhodium:gold, and especially a rhodium:gold ratio of preferably 90% to 99% atomic percent:10 to 1 atomic percent, and most preferably approximately 97% atomic percent:approximately 3 atomic percent, which will exhibit high NOx catalyst activity at low temperature.

While it is not our intention to be constrained by any particular theory, it is believed that when the ratio of rhodium to gold is less than 30 atomic percent, the gold covers the rhodium active sites and the activity is therefore reduced, whereas if it exceeds 99.9%, the degree of oxidation points of rhodium by gold is reduced, thereby further lowering the NOx purification temperature.

The two-element fine particles composed of rhodium and gold according to the invention are characterized by having rhodium and gold in separate phases.

Conventionally, rhodium has been problematic because of its low activity in the oxidized state. In the two-element fine particles of the invention, however, although there is no intention to be constrained to any particular theory, presumably when rhodium and gold are present near each other in the catalyst and gold is further localized, surprisingly, the gold localized near the rhodium inhibits oxidizing inactivation of rhodium and results in excellent NOx reducing power.

Furthermore, while there is no intention to be constrained to any particular theory, it is believed that the mere presence of gold near rhodium is not sufficient and the solid solution instead reduces the surface area of the active sites, as will be explained in detail below, and that rhodium and gold in separate phases instead of a solid solution is able to prevent oxidation of rhodium.

In addition, the fine particles of the invention can have very small primary particle sizes, specifically they can have mean primary particle sizes of about 6 nm or less, about 5 nm or less or about 4 nm or less, and greater than about 1.5 nm, about 2 nm or greater, about 3 nm or greater. According to the invention, the "mean primary particle size" is the particle size measured by powder X-ray diffraction half-power band width measurement and calculated using the crystallite diameter calculation method, unless otherwise specified.

Since the two-element fine particles of the invention have both of the elements rhodium and gold co-present near each other in separate phases, in fine particles with very small primary particle sizes, for example, both of the effects, namely the effect by two-element fine particles and the effect by the separate phases of the two different metals, can be expected.

Furthermore, this embodiment of the invention also provides a method for producing an exhaust gas purification catalyst containing such two-element fine particles with rhodium and gold in separate phases.

The present inventors have found that if an organic compound-based reducing agent, which is not a strong reducing agent but rather a mild reducing agent and volatile, is added to a mixed solution containing a rhodium salt and a gold salt, it is possible to produce two-element fine particles with rhodium and gold in a split phase separate phases on the atomic level.

FIG. 7 is a diagram schematically showing a production process for two-element fine particles according to the invention. For clarity, the method using a strong reducing agent is also illustrated in FIG. 7.

Referring to FIG. 7, first rhodium salts and gold salts are dissolved in one or more solvent(s), and a mixed solution is prepared containing $Rh^{3+}$ ion 11 and $Au^{3+}$ ion 12, and also optionally a protective agent 13 as described below. The ions 11 and 12 form a complex 14 with the protective agent 13. When a boron-based reducing agent is used instead of an organic compound-based reducing agent as the reducing agent, the $Rh^{3+}$ ion 11 and $Au^{3+}$ ion 12 contained in the mixed solution are reduced.

While it is not our intention to be constrained by any particular theory, it is believed that because boron-based reducing agents have much stronger reducing power than organic compound-based reducing agents, the use of a boron-based reducing agent as the reducing agent results in simultaneous reduction of both ions, the $Rh^{3+}$ ion 11 and $Au^{3+}$ ion 12, that are dissolved in the mixed solution, forming fine particles 10 in which Rh and Au are in solid solution on the atomic level.

In contrast, when a relatively mild organic compound-based reducing agent is used as the reducing agent instead of a powerful reducing agent, $Rh^{3+}$ ion 11 and $Au^{3+}$ ion 12 in the mixed solution are reduced. In this case, while it is not our intention to be constrained by any particular theory, it is believed that when a relatively weak reducing agent such as an organic compound is used, the $Au^{3+}$ ion 12 which is more easily reduced than $Rh^{3+}$ ion 11 is preferentially reduced and contributes to grain growth, consequently allowing separate formation of Au fine particles 15 and Rh fine particles 16, for example, with Rh and Au in separate phases.

Since the standard electrode potential in aqueous solution at 25° C. is $E°=1.50(V)$ for $Au^{3+} \rightarrow Au(s)$ and $E°=0.758(V)$ for $Rh^{3+} \rightarrow Rh(s)$, for the method of the present invention there may be used a reducing agent with a standard electrode potential E° of −0.5 or greater in aqueous solution at 25° C., at pH 7, for example.

While it is not our intention to be constrained by any particular theory, it is believed that if the organic compound-based reducing agent is also volatile, this can result in monodispersion in which the formed two-element fine particles undergo primary aggregation while secondary aggregation of the formed two-element fine particles is inhibited. As a result, it is believed that the method of the invention can yield, for example, two-element fine particles 15, 16 in which Rh and Au are in separate phases on the atomic level.

Presumably, synthesis of two-element fine particles composed of rhodium and gold in the form of fine two-element fine particles having a mean primary particle size on the nanometer scale by the method of the invention allows gold to prevent oxidation of rhodium, which cannot be achieved in a bulk state or in a solid solution state as described above.

According to the method of the invention, there is no particular limitation on the rhodium salts and gold salts, and for example, chlorides, nitrates and the like may be used.

Also, the solvent used for the mixed solution containing the rhodium salt and gold salt may be any desired solvent that can dissolve the metal salts, and for example, an aqueous solvent such as water or an organic solvent may be used. In the method of the invention, the rhodium salt and gold salt may be added to the solvent in appropriate amounts corresponding to the Rh/Au ratio (molar ratio) desired in the finally obtained two-element fine particles. There are no particular restrictions, but generally the rhodium salt and gold salt can be added to the solvent so that the molar ratio of the rhodium and gold in the finally obtained two-element fine particles is at any proportion.

The organic compound-based reducing agent for the invention is not particularly restricted so long as it acts as a mild reducing agent, and ketones, esters, alcohols and the like may be used. Specific alcohols include lower alcohols with C1 to C5 alkyl groups, including straight-chain and branched isomers, such as methanol, ethanol, propanol, butanol, pentanol and hexanol. The standard electrode potential E° in aqueous solution at 25° C. is suitably −0.5 or greater and more suitably 0 or greater, at pH 7, for example.

As used herein, "volatile" means having a boiling point of about 120° C. or lower at $1.013 \times 10^5$ Pa, and selection may be appropriately made from among the aforementioned organic compound-based reducing agents.

Also, the method of the invention does not include a step of using a poor solvent with low solubility, it is preferable that this will make it possible to further avoid secondary aggregation of the formed two-element fine particles.

As used herein, a "poor solvent" means a solvent that, when added to the aqueous solution in which the gold salt, rhodium salt and their reaction product are dissolved and/or dispersed, produces visually discernible cloudiness, opaqueness or precipitation by secondarily aggregated particles due to the low solubility in the solvent to which the salts have been added in solution.

For example, when a boron-based reducing agent is used as a strong reducing agent, the boron-based reducing agent remains in the solution, and it cannot be sufficiently decomposed and removed by simply drying the solution. Thus, after a boron-based reducing agent has been used to simultaneously reduce rhodium ion and gold ion, it is usually subjected to purifying treatment using a large amount of acetone or the like. However, addition of acetone is problematic because precipitation of the poor solvent is often generated. When an organic solvent-based reducing agent according to the invention is used, however, it is possible to avoid such precipitation since no poor solvent is used, and monodispersion can be accomplished without further secondary aggregation of the formed two-element fine particles.

Optionally in the method of the invention, an optional protective agent may be added to the mixed solution containing the rhodium salt and gold salt, for the purpose that the protective agent coordinates or adsorbs on the surfaces of the two-element fine particles produced by the method to inhibit aggregation or grain growth between the fine particles and to stabilize them. Such a protective agent used may be any one that is known as a protective agent for metal colloids. For example, as protective agents there may be used organic compounds with powerful coordinating power, including organic polymers, and even low molecular species including heteroatoms such as nitrogen, phosphorus, oxygen and sulfur. As organic polymer protective agents there may be used polymer compounds such as polyamide, polypeptide, polyimide, polyether, polycarbonate, polyacrylonitrile, polyacrylic acid, polyacrylate, polyacrylamide, polyvinyl alcohol, hetero ring polymers, and polyesters. Polyvinylpyrrolidone, polyvinylpyridine, polyacrylamide and the like are most preferably used. By adding such a protective agent to the mixed solution, it is possible to more reliably control the size of the obtained two-element fine particles to the nanometer level.

The support to be used for supporting the two-element fine particles of the invention is not particularly restricted so long as it does not impair the function of the two-element fine particles composed of rhodium and gold, and for example, a known support such as alumina-ceria-zirconia solid solution or alumina may be used.

These examples serve merely for illustration of the two-element fine particles of the invention. Thus, the exhaust gas purification catalyst of the invention can be applied in a wide range of fields, not only for use as an exhaust gas purification catalyst, but also, for example, as an electron conductor, photosensitizer, oxidation-reduction catalyst or the like.

Illustrative examples and comparative examples will now be provided to aid in explanation, with the understanding that the invention is not restricted by the working embodiments.

EXAMPLES

Synthesis Example 1

Synthesis of fine particles comprising rhodium and gold in separate phases (Rh: Au =97 (atomic percent): 3 (atomic percent))

After placing 6.7 g (60.0 mmol) of polyvinylpyrrolidone (PVP) K-25 (weight-average molecular weight: 35,000, manufacturer: Nacalai Tesque, Inc., Product No.: 9003-39-8) in a 1 L separable flask, it was completely dissolved with 75 ml of ion-exchanged water. Next, 0.045 mmol of HAuC14 (manufacturer: Tanaka Kikinzoku Kogyo Co., Ltd.), 1.455 mmol of RhC13 (manufacturer: Tanaka Kikinzoku Kogyo Co., Ltd.) and 675 ml (1.455 mmol) of 1-propanol (manufacturer: Nacalai Tesque, Inc., Product No.: 71-23-8) were added. This was heated to reflux for 2 hours at a bath temperature of 100° C. while bubbling with N2, and then the reaction mixture was allowed to cool to room temperature.

Reference Synthesis Example 1

Synthesis of Rh Fine Particles

After placing 6.7 g (60.0 mmol) of PVP K-25 in a 1 L separable flask, it was completely dissolved in 375 ml of ion-exchanged water. Next, 1.5 mmol of $RhCl_3$ and 375 ml of ethanol were added. This was heated to reflux for 2 hours at a bath temperature of 100° C., and then the reaction mixture was allowed to cool to room temperature. The solution was concentrated to approximately 50 ml to obtain a fine particle dispersion liquid.

Example 1

Synthesis of Fine Particle-Supporting Catalyst

After placing 50 ml of the obtained fine particle dispersion liquid in a 300 ml beaker, water was added for dilution to approximately 100 ml, and the mixture was stirred with a magnetic stirrer. In a separate beaker there was placed 94.8 g of a support powder (alumina-ceria-zirconia solid solution, manufacturer: Cataler Corp.) (at a supporting concentration of 0.1 mass %), and approximately 50 ml of water was added to form a dispersion liquid. This was added to the water-diluted fine particle dispersion liquid, and the dispersing medium was removed by heated stirring at about 150° C.

After subsequently drying at 120° C. for 12 hours, it was pulverized with a mortar and fired in air at 300° C. for 30 hours to obtain a supporting catalyst powder. The powder was molded at a high pressure of 98 MPa to produce a particulate pellet sample with diameters of about 2 to about 5 mm and thicknesses of about 2 to about 5 mm.

Comparative Example 1

Synthesis of Fine Particles Comprising Rhodium and Gold in Solid Solution (Rh:Au=97 (Atomic Percent):3 (Atomic Percent)

After placing 60.0 mmol of PVP K-25 in a 500 mL separable flask, it was completely dissolved in 200 mL of ion-exchanged water. After dissolving 0.045 mmol of $HAuCl_4$ and 1.455 mmol of $RhCl_3$, 9.0 mmol of $NH_3BH_3$ dissolved in 50 mL of ion-exchanged water was slowly added thereto while stirring at room temperature. Upon completion of the addition, stirring was continued for another 10 minutes, and the solution was then transferred to a 2 L beaker, 1200 mL of acetone was added, and the mixture was allowed to stand for 6 hours to naturally precipitate a product. The colorless transparent supernatant liquid was discarded and the residual $NH_3BH_3$ was removed. Next, 100 mL of ethanol was added to the black precipitate, and an ultrasonic cleaner (manufacturer: As One Corp., Model No.: USK-1) was used for dispersion for 15 minutes to obtain a product. After placing the obtained fine particle dispersion in a 300 ml beaker, water was added for dilution to 100 ml, and the mixture was stirred with a magnetic stirrer. In a separate beaker there was placed 94.8 g of a support powder (alumina-ceria-zirconia solid solution), and approximately 50 ml of water was added to form a dispersion. This was added to the water-diluted fine particle dispersion, and the dispersing medium was removed by heated stirring at about 150° C. After subsequently drying at 120° C. for 12 hours, it was pulverized with a mortar and fired in air at 300° C. for 30 hours to obtain a supporting catalyst powder. The powder was molded at a high pressure of 98 MPa to obtain a pellet sample in the same manner as Example 1.

(Catalytic Activity Evaluation)

Using 2 g of catalyst pellet supported and fired by the method described above, a model gas was streamed in under gas conditions of: CO 0.65%, $C_3H_6$: 1000 ppm, NO: 1500 ppm, $O_2$: 0.7%, $CO_2$: 10%, $H_2O$: 0.3% and the remainder $N_2$, at a total flow rate of 10 L/min, and a temperature increase evaluation was conducted. As a result, as shown in the graph plotting NOx 50% purification temperature (° C.) against rhodium atomic percentage ratio (with respect to gold) (FIG. 1), the sample of Example 1 achieved a lower NOx 50% purification temperature compared to the sample of Comparative Example 1, for all Rh atomic percent ranges.

In contrast, the sample of Comparative Example 1, with two-element fine particles composed of rhodium and gold in solid solution instead of separate phases, using the more powerful boron-based reducing agent instead of the organic compound-based reducing agent for production of the fine particles, despite having a lower purification temperature, did not exhibit any peaks but simply fell in a straight manner, and the temperature was much higher than with the two-element fine particles of the invention.

When examined more closely, surprisingly, the NOx 50% purification temperature began to fall from about 330° C. with the sample of Example 1 when the ratio of rhodium with respect to gold exceeded 30 atomic percent. The purification temperature continued to show a tendency to fall as the ratio of rhodium to gold increased, reaching a value of 300° C. or lower from 93 atomic percent to 99 atomic percent, and when the ratio of rhodium to gold was approximately 97 atomic percent, the minimum temperature of about 290° C. was reached.

(STEM-EDX Analysis of Fine Particles)

The sample of Example 1 was analyzed using a scanning transmission electron microscope-energy dispersive X-ray (STEM-EDX) analyzer (HD-2000 by Hitachi, Ltd., acceleration voltage: 200 kV). The sample solution was diluted with ethanol and dried by dropping into a molybdenum grid, for measurement.

In the STEM-EDX photograph (FIG. 2) of two-element fine particles composed of rhodium and gold supported on a support, the light sections represent gold, and the dark sections represent rhodium. Also, the mean primary particle size of the two-element fine particles composed of rhodium and gold for Example 1 was measured from the STEM-EDX photograph to be approximately 3.54 nm.

(Analysis of Rhodium:Gold Atomic Percentage Ratio of Fine Particles)

Figure 2:
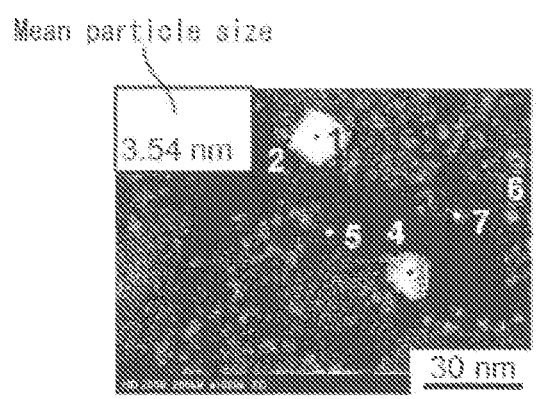
FIG. 2 is a scanning transmission electron microscope/energy dispersive X-ray analyzer (STEM-EDX) photograph of a catalyst of the invention.
Figure 3:
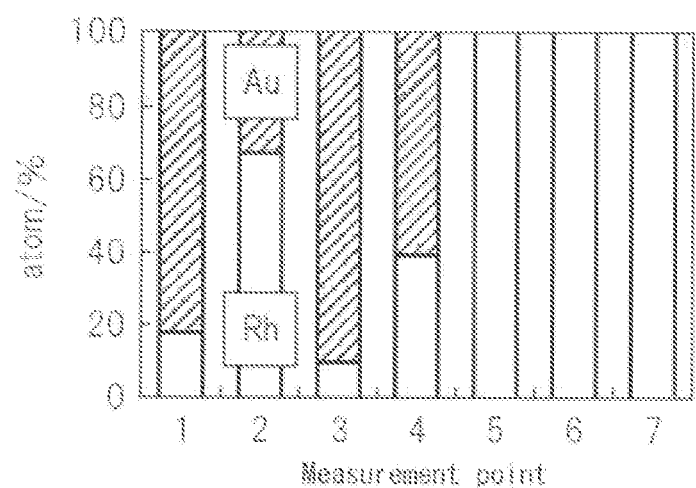
FIG. 3 is a graph showing measurement results for atomic percentages of Rh:Au by STEM-EDX analysis at measurement points 1 to 7 shown in FIG. 3 (STEM-EDX analysis results for Rh-Au (Rh:Au=97:3) nanoparticles supported on support).

The rhodium:gold atomic ratio of the sample of Example 1 was measured at measurement points 1 to 7 in the photograph of FIG. 2. As shown in FIG. 3, the Rh:Au ratio was (greater than approximately 0 atomic percent to less than approximately 20 atomic percent):(less than approximately 100 atomic percent to greater than approximately 80 atomic percent) at measurement points 1 and 3, the Rh:Au ratio was (40 atomic percent:approximately 60 atomic percent) at measurement point 4, and the Rh:Au ratio was (approximately 70 atomic percent:30 atomic percent) at measurement point 2.

Also, it can be seen that in the sample of Example 1, Rh was present in the vicinity of Au, and it had an Au core-Rh shell structure having an Au-rich composition at the center section and a Rh-rich composition at the periphery, while the sample as a whole had a rhodium:gold ratio of approximately 97 atomic percent:approximately 3 atomic percent.

(EDX Analysis)

For the sample of Example 1, measurement was performed by X-ray diffraction (XRD) (RINT2000 by Rigaku Corp.). The specific measuring conditions were as follows.

Measuring method: FT (Fixed Time) method
X-ray source: CuKα
Step width: 0.02 deg.
Counting time: 0.5 s
Divergence slit (DS): ⅔ deg.
Scattering slit (SS): ⅔ deg.

Light Receiving slit (RS): 0.5 mm
Tube voltage: 50 kV
Tube current: 300 mA

Figure 4:
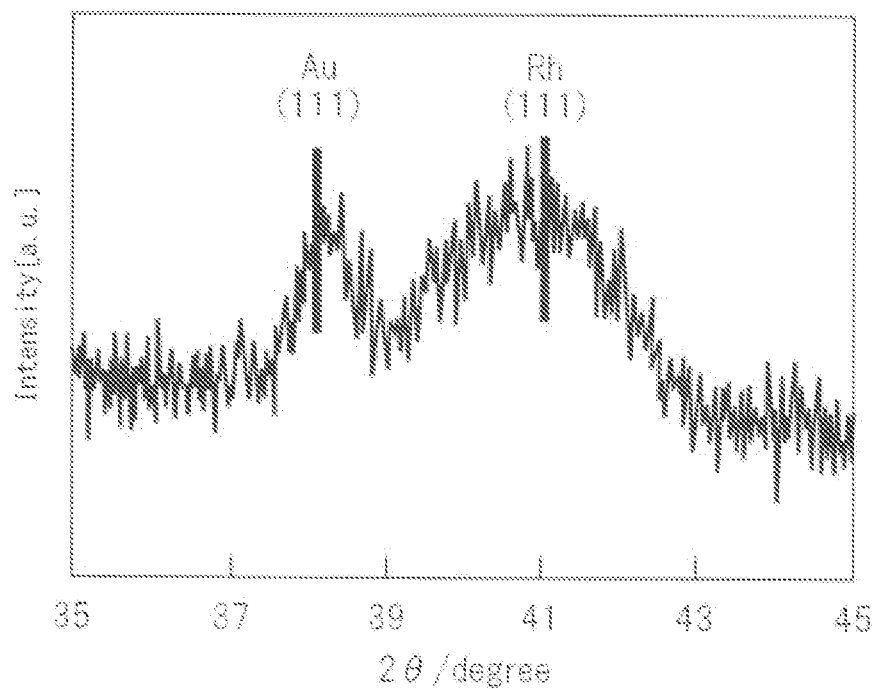
FIG. 4 is a graph showing the results of XRD analysis of a catalyst of the invention (XRD profile with Rh:Au=97:3).

FIG. 4 shows the results of XRD analysis of the two-element fine particles of Example 1. The peaks for the Au(111) plane and Rh(111) plane in FIG. 4 would be the same if both were in solid solution, but since they were independently represented, this indicates that the two-element fine particles composed of rhodium and gold according to the invention were in separate phases.

(Evaluation of NOx 50% Purification Rate with Respect to Purification Temperature)

The samples of Example 1 and Comparative Example 1 were used for measurement of the NOx 50% purification rates under the same conditions as for (Catalytic activity evaluation). As shown in the graph plotting purification rate (%) against purification temperature (FIG. 5), at 400° C., the sample of Comparative Example 1 produced a peak at a conversion rate of approximately 50%, whereas the sample of Example 1 was able to achieve a purification rate of 100% which was about twice that of the sample of Comparative Example 1, thus indicating excellent performance.

(CO Pulse Measurement)

Next, CO pulse measurement was performed for the samples obtained in Example 1, Comparative Example 1 and Reference Synthesis Example 1, using a R6015 by Ohkura Riken, Inc. The oxidation-reduction pretreatment temperature was 300° C., and the operating temperature for measurement was 50° C. As the measuring sample there were used Rh fine particles and fine particles composed of rhodium and gold, supported on $Al_2O_3$, and the supported concentration was measured with a Rh content of 0.10 mass %.

As shown in FIG. 6, the results showed that with the sample of Example 1, the active site surface area was large at approximately 0.18 (m2/g), while with the sample of Comparative Example 1 it was approximately 0.01 (m2/g), which was overwhelmingly smaller than not only the sample of Example 1, but also the approximately 0.15 (m2/g) of rhodium alone in Reference Synthesis Example 1, indicating that with the sample of Comparative Example 1, the active site surface area was lost due to solid solution while with the sample of Example 1, the active site surface area was increased by the separate phases.

INDUSTRIAL APPLICABILITY

With the exhaust gas purification apparatus of the invention, using a NOx purification catalyst employing Rh and Au can eliminate the need for the heating temperature to be a high temperature in order to increase the NOx purification activity, as in the prior art, and since it has NOx purification activity even in a stoichiometric atmosphere, it can render unnecessary, or at least significantly reduce, usage of fuel to convert the atmosphere to a reduced state, and it is possible to provide high NOx purification performance for a wide range of exhaust gas compositions.

EXPLANATION OF SYMBOLS

10 Fine particles
11 $Rh^{3+}$ ion
12 $Au^{3+}$ ion
13 Protective agent
14 Complex
15 Au fine particles
16 Rh fine particles

What is claimed is:

1. An exhaust gas purification catalyst supporting fine particles comprising rhodium and gold on a catalyst support, wherein the rhodium and gold are in separate phases in the fine particles, the rhodium:gold ratio being 30 to 99.9 atomic percent:70 to 0.1 atomic percent.

2. An exhaust gas purification catalyst according to claim 1, wherein the rhodium:gold ratio is 90 to 99 atomic percent:10 to 1 atomic percent.

3. An exhaust gas purification catalyst according to claim 2, wherein the mean primary particle size of two-element fine particles is 2 nm to 5 nm.

4. An exhaust gas purification catalyst according to claim 1, wherein the mean primary particle size of two-element fine particles is 2 nm to 5 nm.

5. A method for producing an exhaust gas purification catalyst according to claim 1, the method comprising
adding an organic compound-based reducing agent to a mixed solution containing a rhodium salt and a gold salt to produce two-element fine particles with the rhodium and gold in separate phases, and then supporting the two-element fine particles on a catalyst support of the catalyst, wherein the reducing agent is volatile.

6. The method for producing an exhaust gas purification catalyst according to claim 5, which does not include a precipitation procedure using a poor solvent for the two-element fine particles.

7. An exhaust gas purification catalyst according to claim 1, wherein the fine particles are two-element fine particles composed of rhodium and gold.

8. An exhaust gas purification catalyst according to claim 1, wherein the fine particles are two-element fine particles consisting of rhodium and gold.

* * * * *